United States Patent
Zhao

(10) Patent No.: US 9,868,139 B2
(45) Date of Patent: Jan. 16, 2018

(54) MEDIA SCRUBBING APPARATUS AND METHOD

(71) Applicant: JCS-Echigo Pte Ltd, Singapore (SG)

(72) Inventor: Liang Zhao, Singapore (SG)

(73) Assignee: JCS-Echigo Pte Ltd, Singapore (SG)

( * ) Notice: Subject to any disclaimer, the term of this patent is extended or adjusted under 35 U.S.C. 154(b) by 87 days.

(21) Appl. No.: 14/697,706

(22) Filed: Apr. 28, 2015

(65) Prior Publication Data

US 2015/0314336 A1 Nov. 5, 2015

(30) Foreign Application Priority Data

May 2, 2014 (SG) .......................... 10201402001W

(51) Int. Cl.

| | |
|---|---|
| *B08B 3/00* | (2006.01) |
| *B08B 1/04* | (2006.01) |
| *B08B 1/00* | (2006.01) |
| *G11B 23/50* | (2006.01) |
| *B08B 7/02* | (2006.01) |
| *B08B 1/02* | (2006.01) |

(52) U.S. Cl.
CPC ................ *B08B 1/04* (2013.01); *B08B 1/002* (2013.01); *B08B 1/02* (2013.01); *B08B 7/02* (2013.01); *G11B 23/505* (2013.01)

(58) Field of Classification Search
CPC .... B08B 7/02; B08B 1/02; B08B 1/04; B08B 1/002; G11B 23/505
USPC ................................ 134/93, 133, 134; 15/77
See application file for complete search history.

(56) References Cited

U.S. PATENT DOCUMENTS 6,254,688 B1 * 7/2001 Kobayashi ................ B08B 1/04
134/1

* cited by examiner

*Primary Examiner* — Eric Golightly
(74) *Attorney, Agent, or Firm* — Carlson, Gaskey & Olds, P.C.

(57) ABSTRACT

A media scrubbing system includes a pair of rotating brushes arranged to rotate in opposed directions and receive media between the rotating brushes so as to scrub downwards on opposed surfaces of the media. The system includes oscillating rollers for supporting the media between the brushes. The oscillating rollers are arranged to reciprocally move vertically so as to oscillate the media as the brushes are rotating.

6 Claims, 4 Drawing Sheets

MEDIA SCRUBBING APPARATUS AND METHOD

REFERENCE TO RELATED APPLICATION

The application claims priority to Singapore Application No. 10201402001W filed on May 2, 2014.

FIELD OF THE INVENTION

The invention relates to the cleaning of a disk-shaped substrate, such as digital storage disks and/or substrates. In particular, the invention relates to an apparatus and methods for more efficient cleaning, and in particular scrubbing, of the media.

BACKGROUND

In the fabrication of HDD media, substrates are cleaned after multiple polish steps and before film depositions. With ever-increasing areal density the substrate need to be extremely clean and free of any residue from prior fabrication steps or environments. Any such, residue will cause disk failure and results in lower yield and higher cost. It is therefore important to provide an efficient and thorough cleaning process, whilst maintaining the rate of processing the media (parts per hour; PPH).

A shortcoming of such an approach lies in the media having an inconsistent rotation due to the single point of contact with the conveyor belt. Conveyor belt also stretches over time and results in disk slippage. Another shortcoming due to single point contact is the inconsistent disk position within the guiding rollers, and this results in inconsistent pick and place of the disk.

Another shortcoming is that the scrubbing position on the disk is fixed, and one cannot preferentially scrub different positions on the surface of the disk. This is needed as substrates are handled via the outside diameter (OD) in most of the disk processing steps and as result the OD of the substrates may be more prone to particles, residues and stains.

SUMMARY OF THE INVENTION

In a first aspect, a media scrubbing system includes a pair of rotating brushes arranged to rotate in opposed directions and receive media between the rotating brushes so as to scrub downwards on opposed surfaces of the media and oscillating rollers for supporting the media between the brushes. The oscillating rollers are arranged to reciprocally move vertically so as to oscillate the media as the brushes are rotating.

In a second aspect, a method of scrubbing media includes the steps of rotating a pair brushes in opposed directions, supporting medium between the rotating brushes with oscillation rollers, so as scrubbing downwards on opposed surfaces of the medium, and reciprocally moving the oscillation rollers so as to move the medium vertically simultaneously with the scrubbing of the opposed surfaces.

A cleaning method allows for an automated process and so meeting the requirements for reliability. The constant controlled shifting of the position of the media against the scrubbing brushes and so preferentially scrubbing more uniformly across the face of the media from Inner Diameter (ID) to Outer Diameter (OD) also avoids the problems associated with disk's inconsistent rotations.

In a further embodiment, the invention may provide for a means of conveying the media along the scrubbing system by providing carriers moving reciprocally along two principle axes. The principle axes being up and down so as to engage and disengage media and longitudinally along the scrubbing system to convey the media from one station to the next.

BRIEF DESCRIPTION OF THE DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

Figure 1:
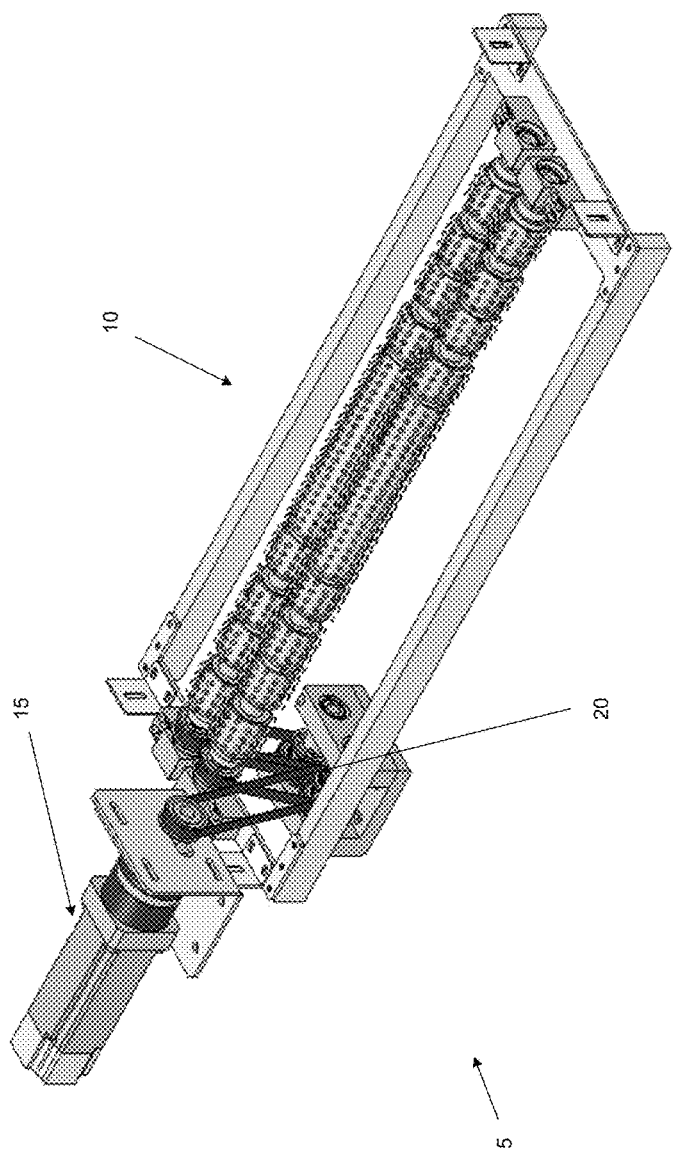
FIG. 1 is an isometric view of a media scrubbing apparatus according to one embodiment of the present invention.

FIG. 1 shows a partial view of a media scrubbing apparatus 5 and in particular a scrubbing brush assembly 10 mounted to a motor 15 through a belt drive 20. Omitted from this view are the edge wheel rollers upon which the media is mounted and the transfer rollers for conveying the media along the scrubbing brush assembly 10. For the present example, the selected media includes digital storage disks.

Figure 2:
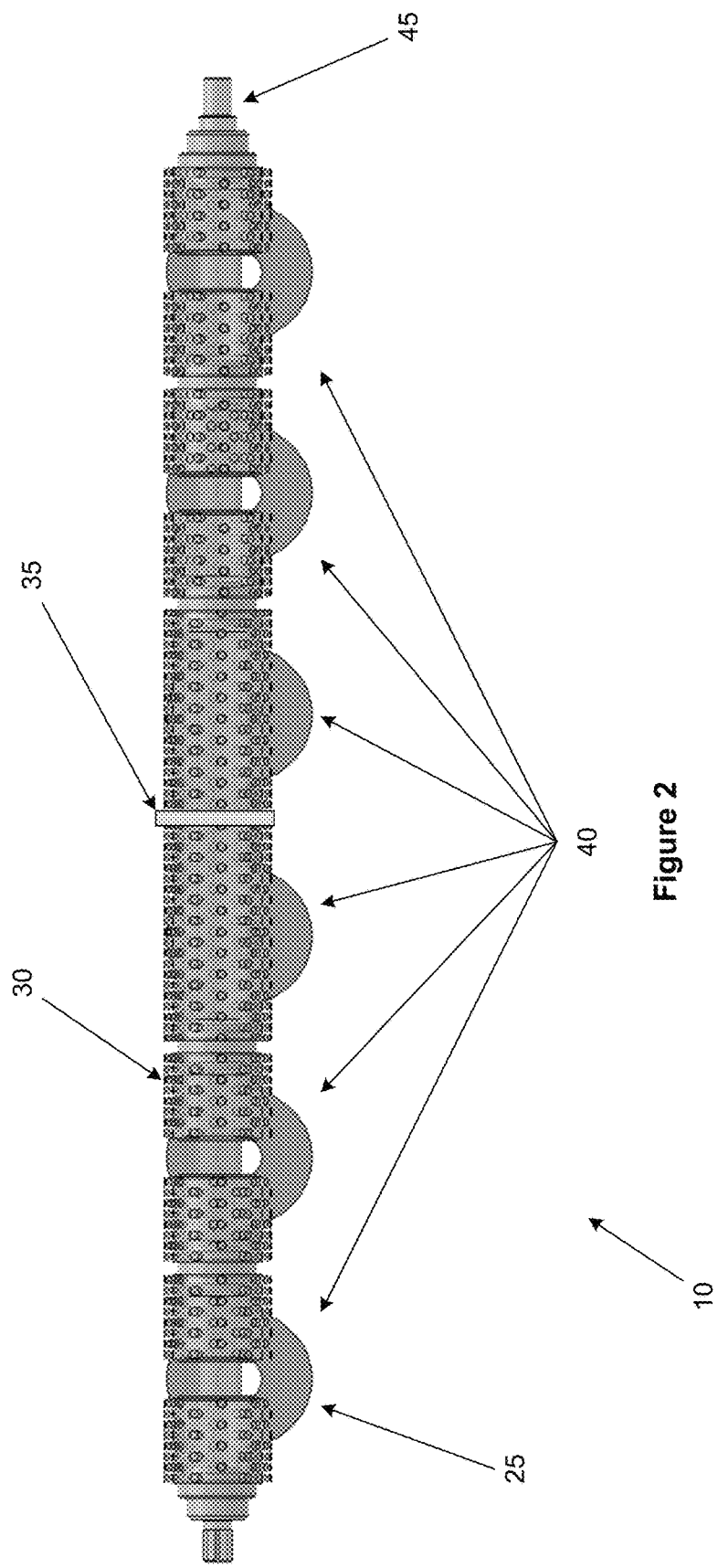
FIG. 2 is a front-side view of a scrubbing brush assembly according to a further embodiment of the present invention.

FIG. 2 is an elevation view of the scrubbing brush assembly 10 which includes a pair of brushes 30 each mounted upon a mandrel 45. The scrubbing brush assembly 10 includes two parallel scrubbing brushes rotating in opposed direction. Media 25, in this case disks, are scrubbed in a plurality of stations 40 along the scrubbing brush assembly 10. As the scrubbing brushes 30 rotate, they push downwards against the disk 25 located between the pair of scrubbing brushes 30. Because the disk 25 is mounted upon the edge wheel rollers, or oscillating rollers, at 2 contact points, the applied friction from the brushes provides a pre-load against the disk, and so maintains a stable base upon the oscillating rollers.

In this embodiment, the scrubbing brush assembly 10 is divided into six stations 40, with the first two and last two stations having twin brushes arranged to load and unload while scrubbing. During the scrubbing process by the scrubbing brush assembly, the oscillating rollers move the media reciprocally up and down simultaneously with the scrubbing action. Thus, having a two stage simultaneous process of moving disks up and down as well as the continuously rotating scrubbing brushes scrubbing across the surface of the media 25 and the edge scrubbing by the oscillating (edge wheel) rollers, a more efficient scrubbing process is achieved for better particle removal, as well as providing multi-directional scrubbing. The scrubbing process from the continuously rotating scrubbing brushes provides a longer scrubbing time per cleaning cycle as compared to reciprocating scrubbing brushes. The edge (OD) scrubbing provides a full cleaning coverage from ID to OD over the disk. The disks are also held in a stable condition due to the pre-load applied by the friction of the scrubbing against the disks surface, permitting for a more robust scrubbing action.

Figure 3A:
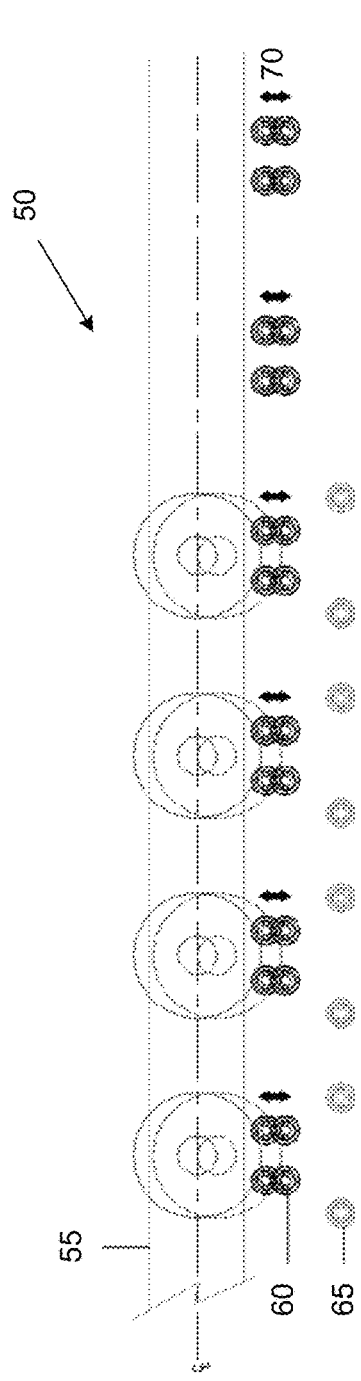
FIGS. 3A to 3F are schematic side views of the progressive scrubbing of media according to a further embodiment of the present invention.

A further embodiment is described with reference to FIGS. 3A to 3F. In FIG. 3A, there is shown the scrubbing brush assembly 50 in which disks are located upon the oscillating rollers 60 and their position relative to the scrubbing brushes 55. FIG. 3A therefore shows the oscillation action 70 of the disks moving up and down relative to the scrubbing brush assembly 55.

Further shown in FIG. 3A are the transfer rollers 65, which for FIG. 3A are in a first disengaged position.

Figure 3B:
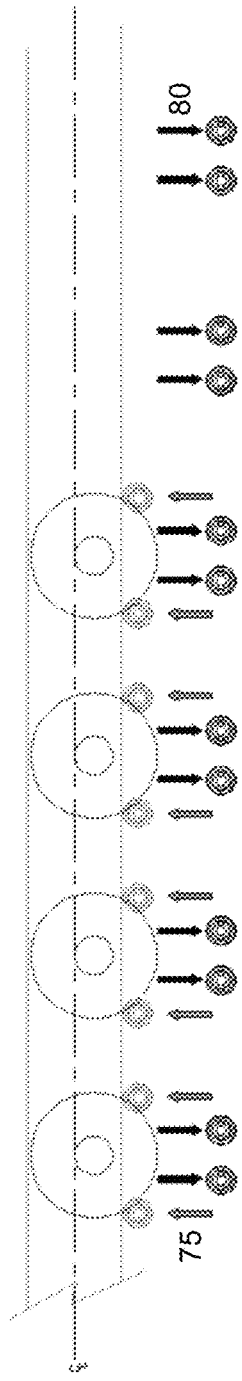

FIG. 3B shows the second stage whereby the transfer rollers 65 move upwards 75 to engage the media. In one embodiment the transfer rollers 65 may move up sufficiently to lift the disks free from the oscillating rollers 60. However, the embodiment shown in FIG. 3B allows for a further embodiment whereby the oscillating disks 60 moves downwards 80 so as to be clear of the disks.

Figure 3C:
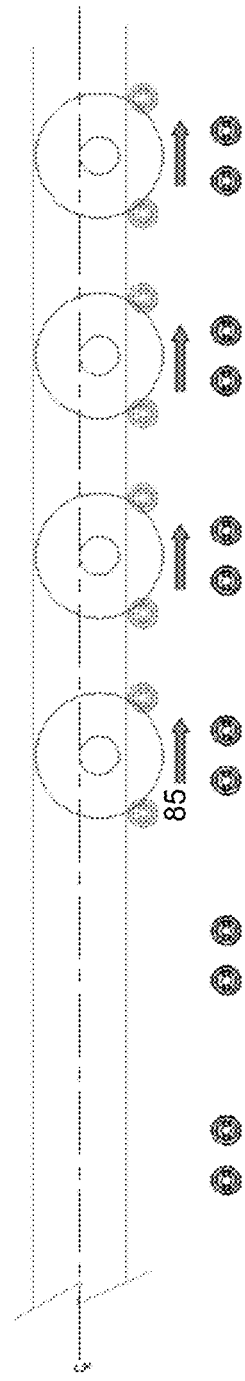

FIG. 3C shows the transfer rollers 65 moving 85 the engaged disks downstream relative to the scrubbing brushes 55. In the present case, the disks are moved two stations. It will be appreciated in alternative embodiments that the disks may be moved one station, three stations, or in fact removed entirely from the scrubbing brush assembly. This may be a function of the scrubbing brush assembly length, or more particularly, how many stations the assembly may incorporate. It may also depend upon the number of cleaning cycles is desired before removal from the assembly.

Figure 3D:
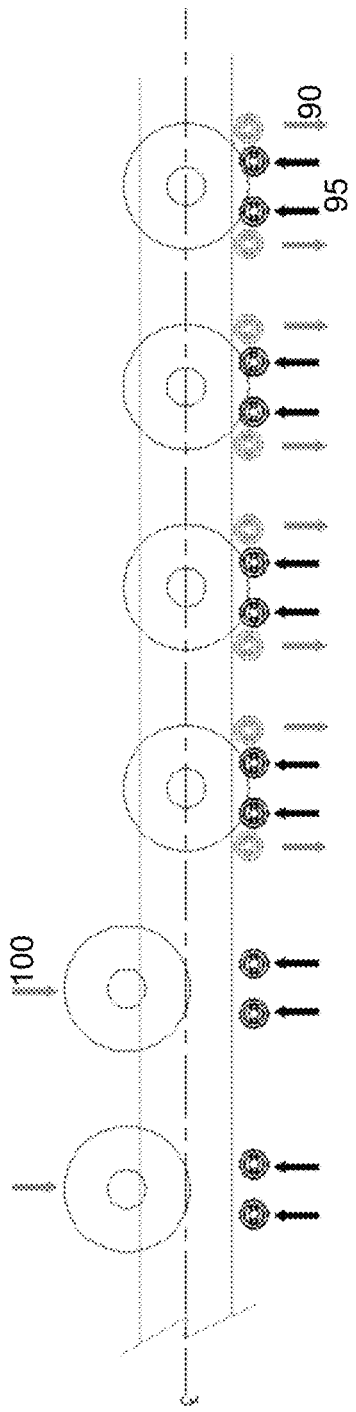
Figure 3E:
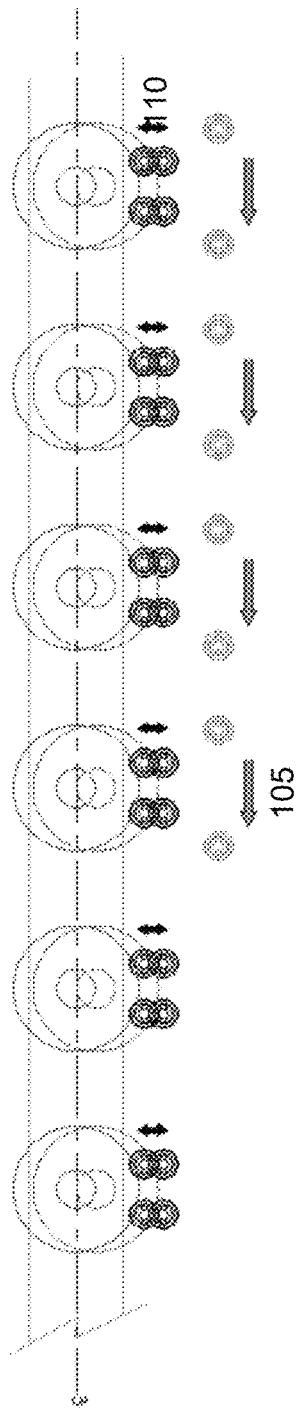

In FIG. 3D, the two vacant stations are then filled by new disks moving 100 into the relevant positions. Additionally in this step, the oscillating rollers move up 95 and the transfer rollers move down 90 such that at FIG. 3E, the scrubbing process resumes with the oscillation 110 recommencing on the existing disks and the two new disks introduced through FIG. 3D.

Figure 3F:
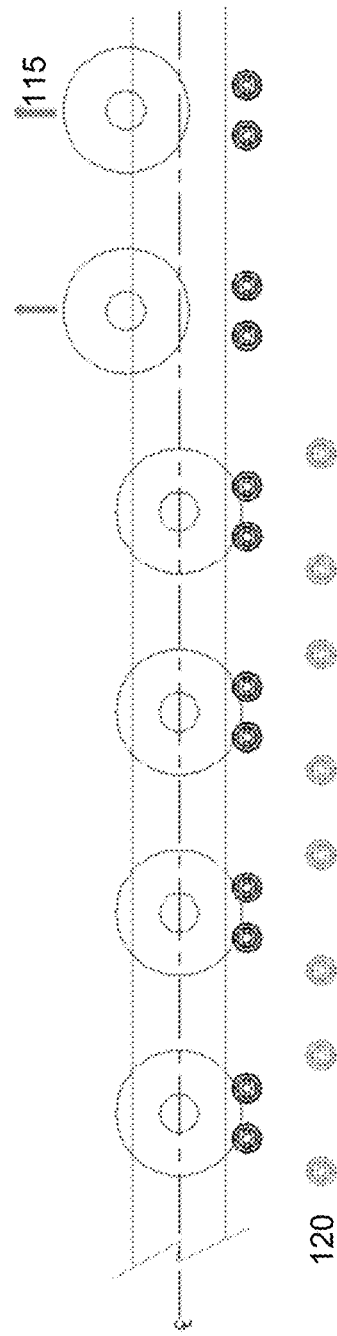

Once disengaged from the disks, the transfer rollers can return 105 to their original position 120, as shown in FIG. 3F. The final step is the removal 115 of any disks having completed required number of scrubbing/cleaning cycles and so vacating two stations and thereby returning the system to the condition as shown in FIG. 3A.

The process shown in FIGS. 3A to 3F is a very specific embodiment, with six stations and disks grouped in pairs. These pairs are moved along the scrubbing brush assembly 50 whereby they undergo the 3 scrubbing cycles. It will be appreciated that there may be more or less scrubbing stations than the six shown in FIGS. 3A to 3F. Further, whilst this embodiment shows pairs of disks undergoing three cycles, there may be more or less disks grouped together. Further, the disks may undergo more or less than three cycles before being removed.

In a further embodiment, the transfer rollers may be free moving rollers. On transfer of the disks from one station to the next, friction against the scrubbing brushes may randomly rotate the disks so as to be in a different orientation in one station as compared to the last. Alternatively, the transfer rollers may be driven rollers to rotate the disks so as to achieve a similar result of having a different orientation of the disks for the next scrubbing cycle as compared to the previous scrubbing cycle.

The arrangement as shown in the preceding embodiments allows for stability in the transfer of disks between stations by maintaining a frictional group between the continuously rotating scrubbing brush assemblies, and so further increase the scrubbing time.

Because of the stability of the system a higher rotational rate of the scrubber may also be provided so as to remove stubborn grit or stains from the disk. Further, in those embodiments when either the oscillating roller or transfer roller are driven, this may allow for the rollers to rotate at a higher rate so as to ensure more efficient scrubbing. In each of these embodiments for the continuous rotation of the scrubbing brush assembly and the embodiments of a driven oscillating roller or driven transfer roller, the position of the disk may be monitored and recorded for the purpose of quality assurance systems.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A media scrubbing system comprising
   a pair of rotating brushes arranged to rotate in opposed directions and receive media between said rotating brushes so as to scrub downwards on opposed surfaces of said media;
   oscillating rollers for supporting the media between the rotating brushes, wherein the oscillating rollers are arranged to reciprocally move vertically so as to oscillate the media as the rotating brushes are rotating; and
   transfer rollers, wherein said transfer rollers are arranged to move vertically from a disengagement position to an engagement position, whereby said media is removed from the oscillating rollers and supported by the transfer rollers.

2. The media scrubbing system according to claim 1, further comprising a plurality of stations for receiving a plurality of media.

3. The media scrubbing system according to claim 1, wherein the oscillating rollers are arranged to rotate the media.

4. The media scrubbing system according to claim 1, wherein the transfer rollers are arranged to move parallel to an axis of the rotating brushes when in the engagement position so as to transfer the engaged media from one station to an adjacent station.

5. The media scrubbing system according to claim 1, wherein the transfer rollers are arranged to move downwards from the engagement position to the disengagement position, said oscillating rollers arranged to reengage with the said medium.

6. The media scrubbing system according to claim 1, wherein said oscillating rollers are arranged to move downwards to permit engagement between the transfer rollers and the media and move upwards to permit disengagement of the transfer rollers and the media.

* * * * *